| United States Patent [19] | [11] Patent Number: 5,068,538 |
| Harley | [45] Date of Patent: Nov. 26, 1991 |

[54] RADON MONITOR WITH SEALABLE DETECTING CHAMBER

[75] Inventor: Naomi H. Harley, Hoboken, N.J.

[73] Assignee: New York University, New York, N.Y.

[21] Appl. No.: 666,889

[22] Filed: Mar. 6, 1991

Related U.S. Application Data

[63] Continuation-in-part of Ser. No. 521,178, May 9, 1990.

[51] Int. Cl.$^5$ ............................. G01T 1/02; G01T 1/11
[52] U.S. Cl. .................................. 250/472.1; 250/253; 250/255; 250/484.1
[58] Field of Search ........ 250/253, 255, 337, 484.1 A, 250/472.1

[56] References Cited

U.S. PATENT DOCUMENTS

| 4,417,142 | 11/1983 | Malmqvist et al. | 250/472.1 |
| 4,920,272 | 4/1990 | Yoder | 250/475.2 |
| 4,948,970 | 8/1990 | Port et al. | 250/472.1 |

Primary Examiner—Carolyn E. Fields
Attorney, Agent, or Firm—Darby & Darby

[57] ABSTRACT

A compact electrically conductive housing includes a plurality of access ports defined in the top section of the housing to permit radon gas ($^{222}$Rn) to diffuse into the housing. The access ports are covered by a diffusion barrier such as a layer of foam rubber sheet inside the housing. The bottom section of the housing includes an integrally molded, electrically conductive pedestal having three recessed wells therein. Two wells contain a stacked pair of an SSNTD on top of a calcium fluoride TLD. The third well contains the same components, but with the TLD on top of the SSNTD, and TLD of this stacked pair is pre-dosed with gamma-rays. The pedestal is covered with a film of electrically neutral aluminized MYLAR (polyester film). A background protection disc prevents substantial exposure of the SSNTDs to radon radition until the desired measurment period beings, once the monitor reaches the intended measurement site. The disc further prevents additional exposure once the intended measurment period is concluded.

18 Claims, 2 Drawing Sheets

RADON MONITOR WITH SEALABLE DETECTING CHAMBER

This is a continuation-in-part of co-pending U.S. patent application Ser. No. 07/521,178, filed May 9, 1990, for a "Personal Gamma-Ray And Radon Monitor."

BACKGROUND OF THE INVENTION

1. Field of the Invention

The invention relates to a device for detecting environmental radon gas concentrations. In particular, the invention is directed to a simple, low cost device for measuring the actual exposure of a person to radon gas, as well as that person's potential exposure due to his or her remaining in any single location substantially all the time.

2. Description of the Prior Art

Radon gas ($^{222}$Rn) is a decay product of the element radium ($^{226}$Ra) which is found in soils and rocks throughout the United States and the world. Radon can diffuse through cracks in rocks and through soil pores and enter the breathable atmosphere. Structures such as homes and other buildings can "trap" the $^{222}$Rn inside them because of typical low air ventilation rates. Concentrations of radon gas can possibly rise to high levels. High concentration levels and their adverse effects on humans are known.

Although average household levels are probably orders of magnitude less than mine levels, the risk at these lower concentrations for developing lung cancer may not necessarily be insubstantial, due to the long time that people spend indoors and sometimes spend living in the same home.

With the threat of lung cancer definitively linked to exposure to $^{222}$Rn, it has become necessary to determine where levels of the radon gas are acceptable and where they represent a significant health risk. This can only be done through actual measurement. Stationary measurements, while useful, may not truly represent actual exposure levels of individuals, because people rarely spend all of their time in any single location.

Accordingly, currently of substantial scientific interest is the issue of actual personal exposure as compared to exposure levels in given locations. Because people tend to move about from place to place, and the time spent in any single location such as in the home or workplace may vary from person to person, there has arisen a need for a device which could conveniently serve as a stationary monitor or a personal radon gas monitor.

In general, continuous radon detection instrumentation is costly, large and requires electric power. Such detection equipment is also known to often require operation by highly skilled technicians, and is generally used for research purposes.

In response to the need for large-scale stationary monitoring of radon gas levels, an "integrating" monitor, in which a signal from the varying concentration of radon gas or its products is accumulated and then averaged over the exposure period to obtain a mean concentration, was developed and described in Harley et al., U.S. Pat. No. 4,800,272, Environmental Gamma-Ray And Radon Detector. The entire disclosure of U.S. Pat. No. 4,800,272 is hereby incorporated by reference.

The detector of U.S. Pat. No. 4,800,272 employs lithium fluoride (LiF) thermoluminescent dosimeters (TLDs) to measure both radon gas exposure and gamma-ray exposure. TLDs are known to be reliable radiation measurement devices. Incident radiation displaces valence electrons in its atomic structure. These electrons are trapped in crystal defects intentionally introduced into the crystal lattice structure, and are released under application of sufficient heat energy. Electron release is accompanied by the emission of light in the 250–400 micron wavelength band. The number of photons emitted per unit time period (under predetermined readout conditions) is directly proportional to the radiation exposure, and the analyzing process is entirely electronic (i.e., no optical counting is required).

In the detector of U.S. Pat. No. 4,800,272, three TLDs serving as radiation detectors are enclosed in a small electrically conductive (shielded) housing. A first one of the TLDs is covered by a protective metallized MYLAR (polyester film) sheet, and detects environmental gamma radiation. A second one of the TLDs is covered by an electrostatically charged dielectric materials, or "electret," to concentrate and collect positively charged radon daughters. Further decay of the so-collected radon daughters produces alpha particle damage to the TLD which may later be measure as noted above. A third one of the TLDs is predosed with gamma radiation in order to provide a reference signal indicative of an amount of fading of the first TLD signal representing gamma-ray exposure.

The passive device of U.S. Pat. No. 4,800,272 is intended to remain in a single location for several months, and thus short-term sensitivity is not a concern. Also, the detection limit (also called sensitivity, or lower limit of detection) of the detector has been found to be approximately 90 picoCuries per liter-days (pCi/L days), which is unsuitable for shorter-term measurements of extremely low exposure levels. Although compact, the size of the device of U.S. Pat. No. 4,800,272 is still nonetheless unsuitable for personal radon exposure monitoring.

In an effort to increase the sensitivity (i.e., reduce the lower limit of detection) and reduce the size of a passive gamma-ray and radon monitor, it was attempted to use more sensitive detector materials in the monitor of U.S. Pat. No. 4,800,272. In particular, another known integrating radon detecting material is the solid state nuclear track detector (SSNTD). An SSNTD film such as cellulose nitrate, cellulose acetate, or a carbonic acid diester, incurs radiation damage tracks left by alpha particles emitted by daughters RaA and RaC'. A very small percentage of alpha radiation directly from radon gas decay into its daughters is also detected by the SSNTD. The alpha particles penetrate the dielectric material, leaving tracks which can be made optically visible by chemical etching for subsequent counting.

U.S. Pat. No. 4,417,142 to Malmqvist et al. describes such an alpha detector which includes a cellulose nitrate film. Malmqvist et al. further describe the desirability of preventing the build-up of static electricity on the detector. To do so, Malmqvist et al. describe covering the cellulose nitrate film with an electrically conductive layer.

While advantageously passive in operation, inexpensive and small in size, generally the SSNTD has not in the past been regarded as highly accurate, due to difficulties in track counting. At low environmental levels, track counting has been especially difficult due to presence of flaws in the detector material which appear as tracks, variations caused by the handling and storage history of the particular detector, and variability in the etching process for enhancing track visibility.

Furthermore, when SSNTDs are used in arrangements similar to that of U.S. Pat. No. 4,800,272 or FIG. 3 of U.S. Pat. No. 4,417,142, radon radiation alpha track counting is difficult because of non-uniformity of electric charge on the electret or conductive film. Such non-uniformity of charge has been observed as causing tracks to occur in dense clusters, rendering track counting very difficult, and sometimes impossible.

Measurement errors introduced by the particular transportation, handling and storage history of each given SSNTD have proven to be especially troublesome. In particular, the detector material begins to register tracks from the moment its alpha-impermeable protective film is removed during assembly of a radon monitor. For large-scale monitoring programs, such monitors may spend a considerable period of time, after assembly, in warehouse storage, in transit to or from the testing site, and/or in temporary storage at intermediate distribution and collection facilities. Radon gas levels at each of these locations and the time spent by the device at each such location are factors which are generally impossible to determine or control to any degree of accuracy. Thus, even the most technologically advanced and accurate detector material may be useless in practice.

Finally, an activated carbon monitor which uses a sealed canister filled with activated carbon is known for short-term radon gas exposure monitoring. When the canister is opened, radon gas is adsorbed onto the carbon; the canister is then resealed after a relatively brief period of time, for example, three days. This pre-measurement sealing has long been understood as a necessity because the activated carbon monitor has a useful life after exposure for a period of only about one week. The gamma-ray emissions from radon daughters trapped on the activated carbon may then be counted. This device is highly sensitive to humidity changes and also has the drawback of variable accuracy, since it is possible for radon to desorb from the carbon during the sampling period.

Thus it is seen that there is a need for a compact, silent, low-cost and portable radon detector which has a very low detection limit (i.e., is highly sensitive), and which can be used for stationary measurements or worn on a person's body, so that actual radon exposure levels can be monitored and compared with simultaneously measured environmental radon levels. Moreover, there is need for such a device whose monitoring accuracy is reliably unaffected by the storage and handling history of that device. None of the aforementioned devices have proven satisfactory for this purpose due to the various reasons mentioned. Thus, it has not yet been feasible to undertake highly accurate large-scale radon measurement programs to determine the actual effects of different environmental levels of radon exposure in private residences and commercial buildings on a particular person or particular group of people, where the sites or persons whose exposure levels are being monitored are remote from the radon monitor assembly and laboratory testing facilities.

SUMMARY OF THE INVENTION

A broad object of the invention is to provide an extremely sensitive and highly accurate, yet still practical, device for measuring a person's actual exposure to radon gas over a period of time. This measured level of exposure may be compared to ambient levels in buildings or locations where the person spends a portion of his or her time, such as in a private home or in the person's workplace.

More specifically, it is an object of this invention to provide a compact, reliable radon detector which can be distributed to, either used as a stationary monitor or worn for a period of time, and then returned by an average person having average technical or mechanical acuity, so as to easily provide a large number of measurements required for determining actual levels of radon gas exposure, as compared with stationary monitoring in specific locations.

It is also an object to provide such a device which is unaffected by the presence of radon gas until the device is at the site or worn on the person to be monitored. Another object is to provide such a device which is similarly unaffected by the presence of radon gas after the measurement period for the device is completed.

Another object is to provide a compact personal radon and gamma-ray detector in the same device.

Another object of the invention is to provide a low-cost personal radon and gamma-ray detector which is virtually maintenance free in operation.

A further object is to provide a compact, light-weight device for measuring the mean concentration of radon gas to which a person or place is actually exposed, over a period of about one month or longer, which does not inconvenience the monitored subject or users of the monitored site in any substantial manner.

Still another object of the invention is to provide a *compact personal radon measuring device which is easily transportable by ordinary mail, parcel post, or the like, without sustaining any damage, and which is unaffected by ambient conditions or varying levels of radon exposure during such transportation.

Another object is to provide actual radon and gamma-ray exposure measurements which are preferable to inferred or calculated exposure levels.

Yet another object is to provide an inexpensive personal radon measuring device which is substantially reusable.

According to the invention, a device for measuring radioactivity exposure due to radon comprises an electrically conductive housing having walls for enclosing a volume of air inside the housing, with at least one wall having at least one opening therethrough for permitting radon gas, but not ambient radon daughters, to continuously diffuse into the volume of air. The device is compact and lightweight, and may suitable be worn by a user on a belt loop or may clipped to an article of clothing in the same manner as is an common electronic paging device or "beeper." The device may also be used as a stationary monitor.

According to a preferred embodiment, a platform or pedestal inside the housing includes three wells or recesses. Two of the three wells preferably contain a TLD chip beneath an SSNTD film. The TLD chip detects radiation due to gamma-rays, while the SSNTD film detects signals due primarily to the decay of radon daughters. A small number of signals are detected resulting from alpha radiation produced by the decay of radon gas to its daughters. The third well preferably contains an SSNTD film beneath and thus shielded by a pre-dosed TLD chip. This detector arrangement in the third well is used for various quality control measurements. Covering the pedestal and thereby retaining the contents of the wells in place is a thin aluminized MYLAR (polyester film) sheet.

A "background protection disc" is provided to selectively expose the detectors to the volume of air within the device during the desired measurement period and to prevent such exposure during transportation, handling and storage periods.

Any electrical charge within the housing of the device according to the invention is scrupulously avoided. The diffusion barrier, the electrically conductive housing and the aluminized MYLAR (polyester film) sheet are all electrically neutral.

Generally according to a preferred embodiment of the invention, a small circular housing comprising a top section and a bottom section is provided. The housing is approximately three inches in diameter and one and one-half inches high, but may advantageously be much smaller, being about the same size as, for example, a large pocket watch. A number of openings or access ports are defined on the top section of the housing to permit radon gas ($^{222}$Rn) to diffuse into the housing. The access ports are preferably covered or partially obstructed by a layer of conductive porous material, such as carbon-loaded urethane, polyurethane or polystyrene, attached to the inside of the housing wall.

The bottom section of the housing includes an integrally molded, electrically conductive platform for housing the radiation detection means according to the invention. In a preferred embodiment, the radiation detection means comprises three stacked pairs of measuring materials. Two of the stacked pairs comprise a solid state nuclear track detector (SSNTD) film on top of a thermoluminescent detector (TLD). Third preferably, comprises a TLD on top of the SSNTD chip, the TLD having been pre-dosed with a known amount of gamma radiation.

The platform is preferably covered with a film or sheet of electrically neutral aluminized MYLAR (polyester film).

A background protection disc is provided to selectably expose the detectors to the volume of air within the housing or to prevent such exposure. The disc is operable by the end-user without opening the housing or disturbing the inner contents thereof in any way.

BRIEF DESCRIPTION OF THE DRAWINGS

Other objects, features and advantages of the invention described in the above brief explanation will be more clearly understood when taken together with the detailed description below and the accompanying drawings, in which.

DETAILED DESCRIPTION OF THE PREFERRED EMBODIMENTS

Figure 1:
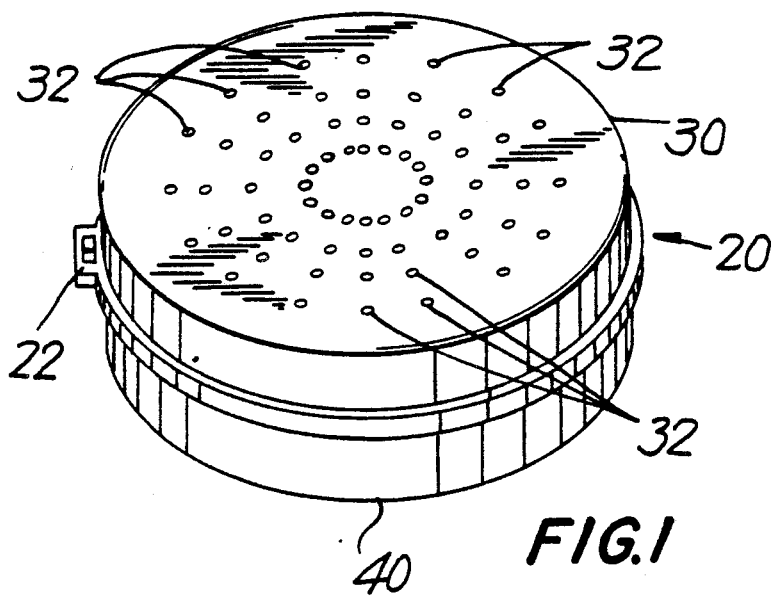
FIG. 1 is a perspective view of an assembled radon measuring device according to the invention.

Referring generally to FIG. 1, a preferred embodiment of a gamma-ray and radon monitor according to principles of the invention is shown. The monitor 20 comprises a generally cylindrical or circular housing having a top section 30 and a bottom section 40. The top and bottom sections 30,40 are preferably molded to fit together to form a sealed unit when fastened together. Such fastening together of the top and bottom sections 30,40 may be accomplished with threaded screws, as further described below, or by molding the sections with integral threaded portions so that the sections screw together, or by any other suitable fastening means.

An eye or fastening portion 22 is advantageously integrally molded to the housing for attachment of a lanyard, strap, chain or similar fastening means so as to permit the monitor 20 to be worn by a person whose radon exposure level is to be measured. The fastening portion may also be used for convenient monitor placement for stationary monitoring uses, such as where the monitor is hung, for example, from a nail or hook.

The housing is preferably constructed from a lightweight, electrically conductive plastic material, such as a conventional carbon-loaded plastic material. The housing may also be fabricated from aluminum sheet, or any other suitable electrically conductive material capable of shielding the inside of the housing from environmental beta-ray flux.

The top section 30 of the housing includes a plurality of openings or through-holes 32 for permitting ambient radon gas to passively enter the monitor 20. This passive diffusion mechanism requires no special equipment, such as pumps or power supplies, to induce air flow into the housing.

As will be readily appreciated, the monitor 20 as just briefly described is designed so as to require a minimum of special construction work such as shaping or milling, and assembly is quite easily completed. It should be understood that there is no special significance to calling one portion a "top" section rather than a "bottom" section, and that this foregoing nomenclature is adopted for the purpose of description only.

The monitor 20 is preferably approximately three inches in diameter by one and one-half inches high, having a general shape and size similar to but slightly smaller than that of a hockey puck. Alternatively, the monitor 20 may be made substantially smaller, having a size and shape generally equal to that of a large pocket watch. A personal monitor of reduced dimensions is preferable due to the savings in cost of production and due to its increased ease of use, i.e., the monitor is less obtrusive to the wearer. Such a smaller version would also be advantageous when used as a stationary monitoring device, being less conspicuous in its measuring site.

Figure 2:
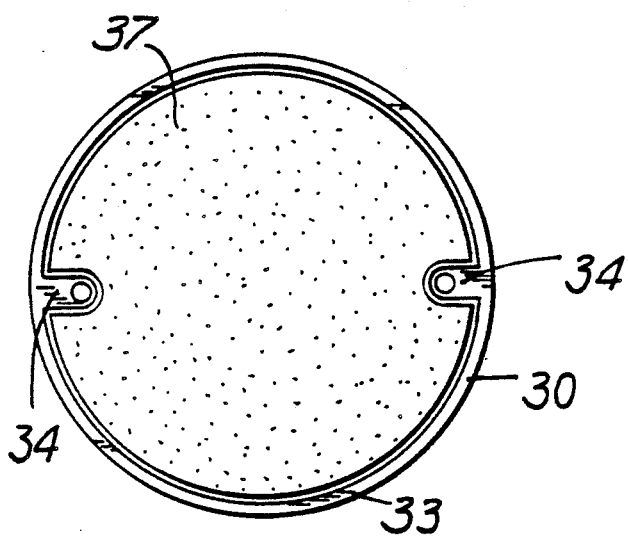
FIG. 2 is a plan view of the inside of the top section of the housing.

FIG. 2 shows the inside of the top section 30 of the housing. The top section 30 of the housing is generally hollow or cup-shaped, having a cylindrical outer wall 33. The top section 30 is preferably provided with at least two integrally molded bosses 34 for receiving fastening screws which may be used to securely fasten the top section 30 to the bottom section 40 of the housing. While the bosses 34 are illustrated as being peripherally located, they need not be so positioned, and the illustrated locations are for ease of manufacture only.

Figure 3:
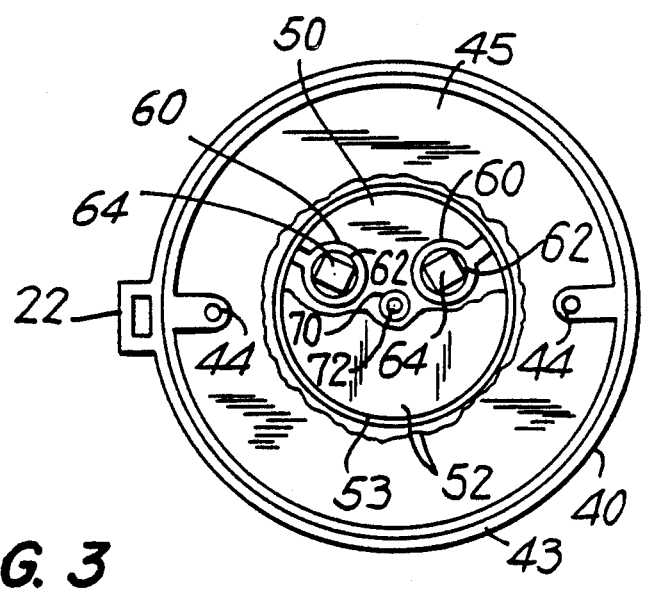
FIG. 3 is a plan view of the inside of the bottom section of the housing, with the background protection disk not shown.

The bosses 34, however, should not interfere with the platform or pedestal 50 of the bottom section 40, seen in FIG. 3.

As noted above, the holes 32 constitute diffusion ports for the passage of radon gas into the housing. The diffusion ports 32 are preferably covered by a foam filter material 37, such as conductive urethane, polyurethane or polystyrene foam, which is suitably attached to the inside surface of top section 30. The filter material 37 serves as a diffusion barrier to prevent entry of ambient radon daughters into the personal monitor 20.

Turning now to FIG. 3, the specific radiation detecting structures are described in connection therewith. First, however, the bottom section 40 is also seen to be generally hollow or cup-shaped, with a cylindrical outer wall 43 and a bottom wall 45. In the preferred embodiment described herein, integrally molded bosses 44 are provided at locations so as to correspond with and mate with the bosses 34 of the top section 30. The bosses 44 may have through-holes therein for receiving fastening screws, which may suitably screw into threaded holes in the bosses 34 of the top section 30. Alternatively, self-tapping screws may be employed to connect the top and bottom sections 30,40 together, in which event threaded holes are unnecessary.

It should be understood that there is no particular significance to the cylindrical shape of the monitor 20. Any shape may be chosen which suitably serves the purposes described herein.

Centrally located on the bottom wall 45 is an integrally molded boss or platform or pedestal 50 for housing the radiation detection means therein. A metallized MYLAR (polyester film) sheet 52 (shown in partial cut-away) covers the pedestal 50 to protect and retain the detector materials therein. When complete, the bottom section 40 further includes a "background protection disc" as will be described below. The background protection disc is not shown in FIG. 3 so that the structures which it normally obscures may be seen and described.

The metallized sheet 52 covering the pedestal 50 may advantageously be held in position by a securing ring 53 in press-fit engagement with and around the periphery of the pedestal 50. The rough edge of the metallized sheet 52 is illustrated in FIG. 3 as partially protruding radially outwardly from under the securing ring 53. It will be understood that this is a matter of illustration only; the metallized sheet 52 may or may not so protrude, depending on how carefully the sheet 52 is trimmed during assembly of the monitor 20. It is desirable for the sheet 52 to be easily removable and replaceable, so that the detector materials may be replaced and the monitor 20 reused.

In the presently preferred embodiment, the metallized sheet 52 has a central hole 70 therethrough. Seen in cross-section in the hole 70 is a shaft 72 mounted in the pedestal 50 and extending from inside the housing to outside the bottom of the housing. The shaft may be mounted in any conventional manner, such as by o-ring seals, which effects an air-tight seal yet provides for rotation of the shaft 72. As is further explained hereinbelow, the shaft 72 permits rotation of the presently preferred background protection disc from a first "storage" or "transport" position to a second "measure" position and back again to the first position.

Integrally formed in the pedestal 50 are three wells 60 (only two visible in FIG. 3 underneath the partially cut-away metallized film 52), each approximately one-half inch in diameter. In a preferred embodiment, two of the three wells 60 contain an approximately one-half inch diameter thermoluminescent dosimeter (TLD) chip 62 beneath a plastic SSNTD film 64. In the third well 60 according to the invention, the SSNTD is placed underneath a TLD chip 62 which has been pre-dosed with gamma radiation, the purpose of which will be explained below. This preferred arrangement serves to advantageously perform radiation monitoring functions according to principles of the invention.

The TLD chip 62 preferably used in this invention is a one-half inch diameter, circular, polished crystal of calcium fluoride ($CaF_2$), such as is commercially available from Harshaw, Inc. located in Solon, Ohio. The TLD is preferably approximately 0.9 millimeters thick. This particular TLD material is extremely sensitive to radiation and is therefore well-suited to measuring relatively minute quantities of radiation over relatively short periods of time.

Another preferred TLD chip material is a crystalline aluminum oxide ($Al_2O_3$). In the form as supplied by Victoreen, Inc. of Cleveland, Ohio, under the designation MODEL 2600-80, the material may be less expensive and more tolerant to rough handling than the above-described calcium fluoride crystal. This aluminum oxide TLD is circular, approximately 5 millimeters in diameter, and is about one millimeter thick.

Other possible, but less desirable thermoluminescent materials include lithium fluoride (LiF) (about 30 times less sensitive than $CaF_2$), lithium fluoride ($^7$LiF) in which the $^7$Li isotope predominates at a high atom fraction of 99.99%, calcium fluoride dysprosium ($CaF_2$:Dy), calcium fluoride manganese ($CaF_2$:Mn), still another variety of lithium fluoride ($^6$LiF), calcium sulfate dysprosium ($CaSO_4$:Dy), and lithium borate manganese ($Li_2B_4O_7$:Mn).

The preferred SSNTD film according to the invention is a 9×9 millimeter film of allyl diglycol carbonate, commercially available under the designation "CR-39" from R. S. Landauer, Jr. and Co. located in Glenwood, Ill. The preferred film thickness is approximately 0.9 millimeters.

The metallized sheet 52 mentioned hereinabove fully covers each of the wells 60 and serves as a protective cover to protect the SSNTDs 64 and TLDs 62 from visible light and dust. In the preferred embodiment, the sheet material 52 comprises a thin layer of aluminized MYLAR having a weight of, for example, 1.7 milligrams per square centimeter. The sheet 52 is stretched taut by the ring 53 which in turn holds the stacked pairs of detectors firmly to the pedestal 50 in their wells 60.

It will be readily apparent to those skilled in the art that numerous physical configurations are possible without deviating from the basic principles of this preferred structure. The particular shapes and locations of the pedestal 50, the wells 60, the detector materials 62, 64 and the protective metallized sheet 52 are not believed to be critical, but instead are matters of simplicity and convenience from a manufacturing and assembly standpoint only.

The metallized sheet 52 is not electrically charged in any manner. There is also an absence of electrical charge on any other component of the monitor 20. It has been found that the presence of any electrical charge on the sheet, such as when the sheet is a highly charged electret, or as suggested by FIG. 3 of U.S. Pat. No. 4,417,142, causes severe concentrations of nuclear damage tracks on the SSNTD as a result of the inability to place a perfectly uniform charge on the electret. These track concentrations have been seen to occur to such a degree that track counting is most difficult, and may even be rendered impossible in some cases. Because the metallized MYLAR sheet 52 does not hold a charge, the radiation damage tracks are substantially uniformly distributed over the SSNTD film 64.

Figure 4A:
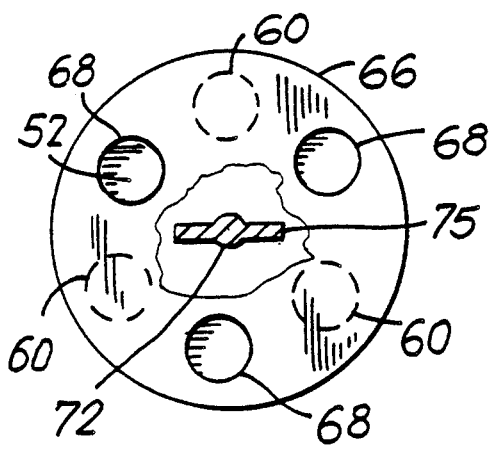
FIG. 4a is a partial top view illustrating a preferred embodiment of the background protection disc in its "storage" 3 position.
Figure 4B:
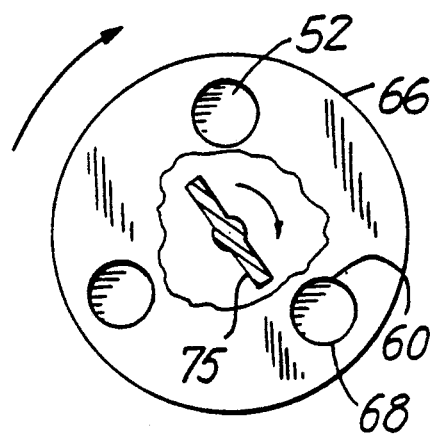
FIG. 4b is similar to FIG. 4a, but with the disc in its "measure" position.
Figure 5:
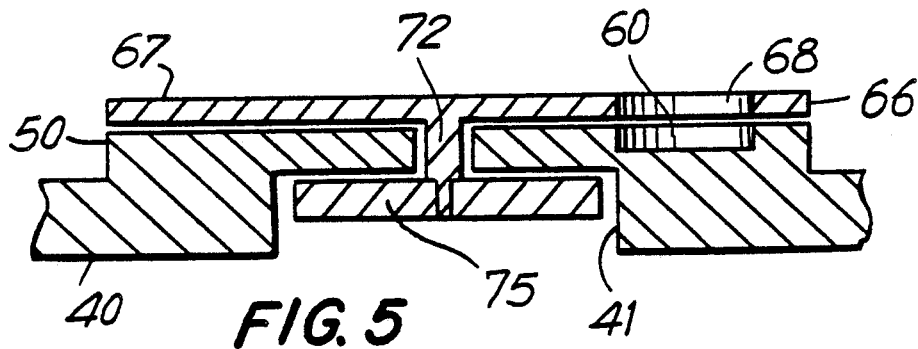
FIG. 5 is a partial side cross-sectional view of the bottom section of the housing with a preferred background protection disc mounted thereto.

Referring now to FIGS. 4a, 4b and 5, the structure and function of the aforementioned background protection disc 66 will be described. The disc 66 comprises an inner circular portion 67 integral with a centrally disposed shaft 72 for rotation of the disc 66. The shaft 72 passes through the bottom section 40 in rotatable, sealed engagement (seals not shown) so as to protrude into a molded cavity 41 in the underside of the housing bottom section 40. Removably attached to the lower end of the shaft 72 is a handle 75 for manually rotating the shaft 72 and its integral inner circular portion 67.

Again it will be understood that numerous variations of this arrangement are easily possible. For example, the shaft 72 and handle 75 may be integral and removably attached to the circular portion 67. The presently preferred shapes of these features is not critical. All that is required is that there be some manner of gaining physical access to the wells 60 in order to remove and replace the detector materials.

At the time of assembly of the monitor 20, the several detector materials are placed in their respective locations in the pedestal 50. The metallized sheet 52 is placed over the pedestal and is secured in place (sheet 52 and ring 53 not illustrated in FIG. 5). The inner circular portion 67 of the background protection disc 66 is positioned on the pedestal 50 in close contacting engagement with the pedestal 50. A slight space is illustrated in FIG. 5 for the sake of clarity only. Finally, the handle 75 is removably secured to the shaft 72 protruding into the cavity or recess 41 on the underside of the bottom section 40.

The inner circular disc 67 preferably has three openings 68 or through-holes which correspond in size, shape and orientation to the pedestal's wells 60. As seen in FIG. 4a, the disc 66 is positioned in a first "storage" or "transport" position. In this condition, the protection disc 66 covers the metallized sheet 52 over the wells 60. An exceedingly small volume of air is thus trapped in each of the wells 60, and the detector materials will not be affected by the ambient air which diffuses into the housing through the holes 32.

When the monitor 20 reaches its intended measuring site, the handle 75 is manipulated to rotate the protection disc 66 to a second "measure" position as seen in FIG. 4b. In this second position, the through-holes 68 of the circular portion 67 are aligned with the covered wells 60, thus permitting alpha particles to penetrate the metallized sheet 52 and impact the radiation detector materials thereunder. This position is seen in FIG. 5, as well.

Ambient air diffusing into the housing will continue to cause nuclear track damage to the SSNTDs until the disc 66 is rotated back to its first "transport" position. Detents (not shown) may be advantageously provided to releasably maintain the handle 75 in each of the desired "transport" or "measure" positions.

The inner circular disc 67 may be made of any alpha-impermeable material, and is preferably fabricated from a carbon-loaded or similarly conductive plastic material.

Figure 6:
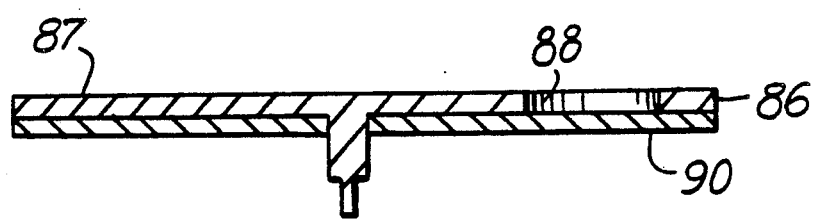
FIG. 6 is an alternative embodiment of a background protection disc.

An alternative embodiment of the background protection disc is shown in FIG. 6. In the illustrated alternative embodiment, a background protection disc 86 once again preferably includes an inner circular (or other appropriately shaped) portion 87 having a number of through-holes 88 suitably located therein. Affixed to and completely covering the pedestal-contacting side of the portion 87, however, is the metallized MYLAR (polyester film) sheet 90. When assembled, the sheet 90 is held in conductive contact with the conductive pedestal 50 of the housing bottom portion 40.

This arrangement simplifies assembly of the device by eliminating the delicate metallized sheet 52 and its retaining ring 53. For large-scale monitoring programs, such a time-saving feature would likely be most valuable, especially when it is kept in mind that the monitors will be reused many times, with the detector materials being replaced with each such reuse.

Having now described the structural arrangement of a preferred as well as an alternative embodiment of the invention, its functioning will be described.

The wells 60 in which the SSNTD 64 is placed on top of the TLD 62 are used to measure actual exposure to gamma-ray and radiation due to radon gas in duplicate fashion. Whereas this duplicate stack arrangement is most reliable from a scientific viewpoint, the accuracy of the invention is such that the device may include but a single SSNTD, if so desired. Environmental gamma-rays from terrestrial sources induce a measurable signal in the TLDs, as do incoming cosmic rays. Both of these types of radiation pass through the SSNTDs for detection by the TLDs.

The SSNTDs suffer radiation damage tracks left primarily by alpha particles emitted by radon daughters RaA and RaC'. The alpha particles penetrate the surface of the detector material, leaving tracks which can be made optically visible by chemical etching, for subsequent counting. The metallized MYLAR protective sheet 52 results in very little alpha particle loss. It has also been found that the damage tracks may be advantageously counted by placing the SSNTD film on a conventional microfiche reading machine. The illumination and magnification of such machines has been found to be quite satisfactory for this purpose. Preferably, tracks over the entire area of the SSNTD film are counted, rather than over any fractional portion thereof. This improved track counting method, coupled with the use of a high quality detector material which has been carefully handled and stored, and further coupled with the scrupulous avoidance of electrical charge on any component of the monitor 20, advantageously overcomes the general prejudice in the art against the use of SSNTDs as a practical radon monitoring material.

It may even be suitable, in the interest of expense, to eliminate one of the two duplicate detector stacks, once the high degree of accuracy and reliability of this monitoring structure and measurement method has been sufficiently demonstrated.

The third well 60 preferably contains a TLD which has been pre-dosed with gamma radiation, placed on top of the SSNTD, as noted above. This arrangement permits the determination of the natural or inherent radon background level of the SSNTD (which is shielded by the TLD), as well as determining any possible signal loss (fading) in the gamma-ray measuring TLDs.

For example, the third TLD may be irradiated with a known exposure of gamma-rays prior to placement in the housing. After the monitor 20 has been returned by the user, the net signal per unit of exposure of the irradiated TLD may be compared with that from other TLDs irradiated on or about the date that the signal of the returned irradiated TLD are determined. A comparison of these two signal strengths per unit of gamma-ray exposure can be used to determine the degree of fading, if any, which might have occurred during the monitoring period. While useful, the third well and its contents, as just described, are deemed to be optional. The inherent radon background level of the SSNTD material may be generally known, with a statistical degree of accuracy.

It will also be appreciated that, in the event there is no interest in measuring gamma radiation, each of the abovedescribed TLDs may simply be omitted, except in the optional third well. There, the TLD acts to shield the SSNTD from alpha particles. Any other suitable alpha particle barrier may be substituted for the shielding TLD, in the event the "control" SSNTD is used.

The gamma-ray sensitivity of the TLDs must be known through accurate calibration. This calibration may be accomplished in any generally known conventional manner, such as the method described in U.S. Pat. No. 4,800,272. In addition, the measured SSNTD signal due to decay of radon daughters in the housing must be related to a level of radon gas ($^{222}$Rn) concentration in ambient air. This calibration factor may easily be determined using well-known techniques, wherein the monitor 20 is exposed to known concentrations of radon gas ($^{222}$Rn) under controlled circumstances.

The lower limit of detection of the new gamma-ray and radon monitor as described hereinabove is about one picoCurie per liter day (pCi/L day). The very low inherent radon background of allyl diglycol carbonate permits detection of very low levels of radon. The monitor can measure 20 pCi/L days (i.e., 2 pCi/L for 10 days) with +/−20% precision. This compares very favorably to the best possible results for activated carbon canister monitors, the only other potentially suitable radon monitoring device for personal exposure monitoring.

While one preferred and one alternative embodiment of the invention have been described in detail, it will be understood that many variations and modifications are possible without departing from the spirit and scope of the invention. For example, there is shown in FIG. 3 an open area between the pedestal 50 and the outer wall 43 of the bottom section 40 of the housing. The radon collection efficiency of this area is known to be low, and thus this space may advantageously be eliminated. Such a modification would yield the pocket-watch sized monitor previously mentioned.

I claim:

1. A radiation monitor comprising:
   an electrically conductive housing having walls defining an internal volume of space;
   at least one hole through a wall of the housing for permitting entry of ambient air into the thermal volume of space;
   at least one solid state nuclear track detector disposed within the housing;
   a barrier within the housing; and means for moving the barrier from outside the housing between a first position in which the at least one solid state nuclear track detector is substantially isolated from alpha radiation in the internal volume of space and a second position in which the at least one solid state nuclear track detector is exposed to alpha radiation in the internal volume of space,
   wherein there is substantially no electrical charge present on any portion of the personal radiation monitor.

2. The monitor of claim 1, wherein the at least one solid state nuclear track detector is removably located in an internal detector mounting portion integral with a wall of the housing, the internal detector mounting portion also being electrically conductive.

3. The monitor of claim 2, wherein the at least one solid state nuclear track detector is covered by a protective, conductive sheet.

4. The monitor of claim 3, wherein the protective, conductive sheet comprises a metallized polyester film sheet, and wherein the sheet is removably secured to the internal detector mounting portion.

5. The monitor of claim 3, wherein the barrier covers a portion of the protective, conductive sheet adjacent the at least one solid state nuclear track detector when the barrier is in the first position, and does not cover the portion of the protective, conductive sheet adjacent the at least one solid state nuclear track detector when the barrier is in the second position.

6. The monitor of claim 1, further comprising:
   a diffusion barrier disposed on an inside surface of the hole-containing wall of the housing.

7. The monitor of claim 1, further comprising:
   means for permitting the monitor to be worn by a person.

8. The monitor of claim 1, wherein the housing is formed of carbon-loaded plastic.

9. The monitor of claim 1, wherein the at least one solid state nuclear track detector comprises a film of allyl diglycol carbonate.

10. The monitor of claim 1, further comprising a second solid state nuclear track detector disposed within the housing.

11. The monitor of claim 10, further comprising a thermoluminescence dosimeter disposed underneath each solid state nuclear track detector.

12. The monitor of claim 10, further comprising a third solid state nuclear track detector disposed within the housing.

13. The monitor of claim 12, further comprising three thermoluminescence dosimeters disposed underneath two of the three solid state nuclear track detectors and on top of the third solid state nuclear track detector, respectively wherein the thermoluminescence dosimeter disposed on top of the third solid state nuclear track detector has been pre-dosed with radiation.

14. The monitor of claim 12, wherein the thermoluminescence dosimeters comprise chips of calcium fluoride ($CaF_2$) and the solid state nuclear track detectors comprise films of allyl diglycol carbonate.

15. The monitor of claim 1, further comprising a thermoluminescence dosimeter disposed underneath the at least one solid state nuclear track detector.

16. The monitor of claim 15, wherein the thermoluminescence dosimeter comprises a chip of calcium fluoride ($CaF_2$) and the at least one solid state nuclear track detector comprises a film of allyl diglycol carbonate.

17. A radiation monitor comprising:
   an electrically conductive housing having walls defining an internal volume of space;
   at least one hole through a wall of the housing for permitting entry of ambient air into the internal volume of space;

at least one solid state nuclear track detector disposed within the housing, the at least one detector being removably mounted in a conductive, internal, detector mounting portion integral with a wall of the housing;

a background protection member within the housing including an alpha particle shield and a protective, conductive sheet, the member being disposed so that the protective, conductive sheet is in conductive contact with the detector mounting portion; and means for moving the background protection member between a first position in which the at least one solid state nuclear track detector is substantially isolated from the internal volume of space by both the alpha particle shield and the protective, conductive sheet, and a second position in which the at least one solid state nuclear track detector is separated from the internal volume of space only by the protective, conductive sheet, wherein there is substantially no electrical charge present on any portion of the personal radiation monitor.

18. The monitor of claim 17, wherein the background protection member is detachably mounted to the housing and is movable between its first and second positions without opening the housing.

* * * * *